United States Patent [19]

O'Meara

[11] Patent Number: 4,854,677
[45] Date of Patent: Aug. 8, 1989

[54] INTERFEROMETRIC/FEEDBACK SPATIAL LIGHT MODULATION SYSTEM AND METHOD

[75] Inventor: Thomas R. O'Meara, Malibu, Calif.

[73] Assignee: Hughes Aircraft Company, Los Angeles, Calif.

[21] Appl. No.: 135,857

[22] Filed: Dec. 21, 1987

[51] Int. Cl.$^4$ ............................................. G02F 1/01
[52] U.S. Cl. ................................. 350/355; 350/354; 350/353
[58] Field of Search .............. 350/354, 355, 356, 357, 350/353

[56] References Cited

U.S. PATENT DOCUMENTS

| | | | |
|---|---|---|---|
| 3,586,416 | 6/1971 | De Bitetto | 350/356 |
| 4,149,073 | 4/1979 | Bar-Chaim et al. | 350/356 X |
| 4,546,248 | 10/1985 | Craig | 350/354 |
| 4,750,834 | 6/1988 | Fateley | 350/357 X |

FOREIGN PATENT DOCUMENTS 0155516  9/1982  Japan .................................... 350/356

OTHER PUBLICATIONS

Bilenko et al., "Use of Low-Inertia Semiconductor Structures to Modulate Radiation in a Submillimeter Laser Interferometer", *Inserum of Exp. Tech.*, vol. 21, No. 6, pp. 1575–1577, Jun. 1979.

Bleha, "Progress in Liquid Crystal Light Values", *Laser Focus/Electro-Optics*, Oct. 1983, pp. 111–120.

Glenn D. Craig, "Wide-Brightness-Range Video Camera", NASA Tech. Briefs, Fall 1985, p. 52.

D. Psaltis, J. Yu, A. Marrakchi and A. R. Tanguay, Jr., "Photorefractive Incoherent-to Coherent Optical Conversion", SPIE, vol. 465, Spatial Light Modulators and Applications (1984), pp. 2–8.

David Casasent, "Spatial Light Modulators", Proceedings of the IEEE, vol. 65, No. 1, Jan. 1977, pp. 143–157.

*Primary Examiner*—Eugene R. LaRoche
*Assistant Examiner*—Nathan W. McCutcheon
*Attorney, Agent, or Firm*—V. D. Duraiswamy

[57] ABSTRACT

A spatial light modulator and associated method are disclosed which achieve an intensity-to-intensity spatial transformation between a noncoherent input beam and a coherent output beam. An intermediate intensity-to-phase modulator provides a coherent, spatially phased modulated readout beam that is combined with a coherent reference beam in an interferometer to yield the desired coherent, spatially intensity modulated output beam. The interferometer also produces a feedback beam with a spatial intensity modulation complementary to that of the input and output beams. The feedback beam is combined with the input beam in a feedback loop that significantly improves the system's response time, and can also enhance the linearity of its transfer characteristic.

20 Claims, 2 Drawing Sheets

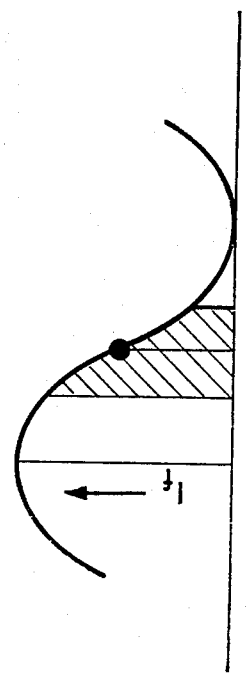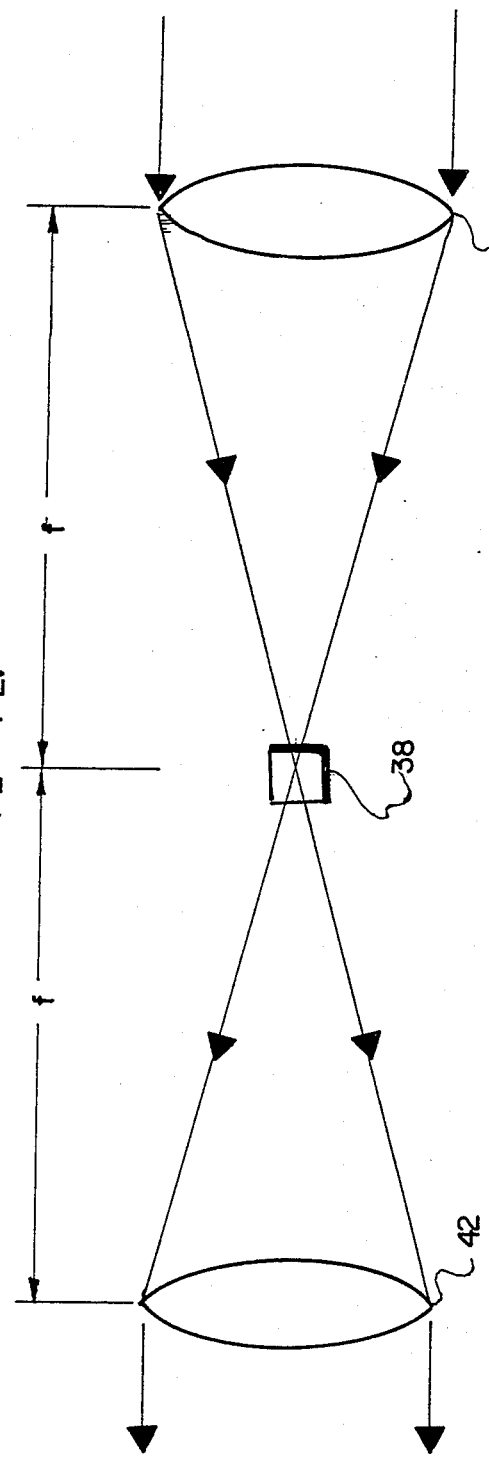

INTERFEROMETRIC/FEEDBACK SPATIAL LIGHT MODULATION SYSTEM AND METHOD

BACKGROUND OF THE INVENTION

1. Field of the Invention

This invention relates to spatial light modulation, and more particularly to systems and methods which are capable of transforming a noncoherent light beam with a given spatial intensity pattern to a coherent beam which retains the spatial intensity information.

2. Description of the Related Art

It is desirable to be able to perform optical data processing based upon a noncoherent light image. For example, the light pattern appearing on the screen of a cathode ray tube (CRT) may be manipulated, enhanced, intensified or otherwise processed by breaking down the image into a matrix of pixels, and operating upon each of the pixels individually depending upon its intensity. Other sources of noncoherent light that may be subjected to optical data processing techniques include light emitting diode and laser diode arrays, and in general any high-speed scan system, such as an accousto-optic scanner.

Optical data processing Fourier transformations and the like can be performed more readily with coherent than noncoherent beams. Accordingly, devices have been developed for transforming a spatial intensity modulation pattern on a noncoherent beam into a corresponding spatial pattern on a coherent wavefront. Such devices typically transform the spatial intensity pattern on the noncoherent beam to a spatial phase pattern on the coherent beam, such that the phase of each pixel in the coherent beam varies with the light intensity in a corresponding pixel of the noncoherent beam. An example of a device that transforms spatial noncoherent intensity modulations to coherent phase modulations is provided in the article by D. Psaltis et al., "Photorefractive Incoherent-to-Coherent Optical Conversion", Proceedings of the SPIE, Volume 465 Spatial Light Modulators and Applications, Jan. 26–27, 1984, pp. 2–8. A variety of spatial light modulators that are used to modulate a coherent beam of light from a number of different inputs are summarized in D. Casasent, "Spatial Light Modulators", Proceedings of the SPIE, Volume 465, Spatial Light Modulators and Applications, Jan. 26–27, 1984, pp. 143–157.

Current devices that perform a transformation from noncoherent intensity modulation to coherent phase modulation generally suffer from a relatively slow response time, and in addition do not exhibit optimum linearity. That is, their transfer characteristics do not produce variations in the coherent output beam that are directly proportional to variations in the noncoherent beam throughout the operating range. Furthermore, it would often be desirable to accomplish the noncoherent-to-coherent transformation by modulating the spatial intensity of the output coherent beam, rather than its spatial phase.

SUMMARY OF THE INVENTION

In view of the above limitations of the prior art, a purpose of the present invention is the provision of a novel and improved system and method for spatially encoding a coherent output beam with information from a noncoherent input light beam, with a faster speed of operation and a more linear transfer characteristic than in the prior art.

The invention also seeks to provide a system and method which incorporate an intensity-to-phase spatial light modulator, and transform the modulator's output back to an intensity modulation on a coherent output beam.

These and other goals are achieved by the use of coherent interference to expand an intensity-to-phase spatial light modulator into an intensity-to-intensity modulation system, and an optical feedback loop which combines coherent and noncoherent signals to speed up and linearize the system operation. A spatial intensity modulation on a noncoherent input beam is encoded as a spatial phase modulation onto a readout beam by means of an available spatial light modulator. A feedback beam is formed in a manner responsive to the readout beam so that the feedback beam has a spatial encoding which varies in a negative fashion with respect to spatial variations in the intensity of the input beam. The feedback beam is combined with the input beam in a negative feedback loop that enhances the system's response time to variations in the input beam, and makes its transfer characteristic more linear.

A coherent output beam with a spatial intensity modulation corresponding to the noncoherent input beam is established with the use of a reference beam that has a predetermined spatial phase relationship to the readout beam. The reference and readout beams are combined in an interferometer to produce an output beam with a spatial interference pattern that corresponds to the noncoherent input beam's intensity pattern.

In a preferred embodiment, the reference beam is established with a generally 90° spatial phase differential with respect to an unencoded readout beam. The readout and reference beams are formed from a common laser source. The laser beam is directed onto a beam splitter which divides the beam into reference and readout portions. The readout beam is reflected off the modulator back to the beam splitter, while the reference beam is reflected back to the beam splitter with the desired phase differential. The beam splitter then combines the reflected reference and readout beams into the output and feedback beams. The system is designed so that spatial intensity variations in the feedback beam are opposite in direction and slightly less in magnitude than spatial intensity variations in the input beam. The ratio of feedback spatial intensity variations to input spatial intensity variations is preferably $-G/1+G$, where G is the feedback loop gain.

These and other features and advantages of the invention will be apparent to those skilled in the art from the following detailed description of preferred embodiments, taken together with the accompanying drawings, in which:

DESCRIPTION OF THE DRAWINGS

FIG. 3 is a graph relating the intensity of a system feedback signal $I_f$ to the system phase shift; and FIG. 4 is a block diagram of a lens and field stop system that may be employed to increase the output contrast ratio.

DETAILED DESCRIPTION OF A PREFERRED EMBODIMENT

Figure 1:
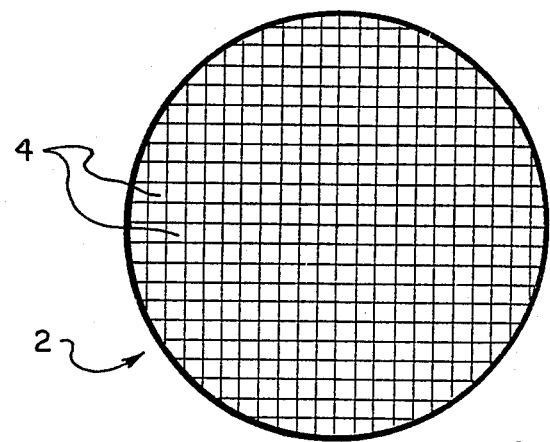
FIG. 1 is a diagram of a spatially encoded input beam divided into pixel segments, the sizes of which are exaggerated.

A spatially modulated light beam can be visualized, as indicated in FIG. 1, as an overall beam 2, the cross-section of which is divided into an array of a large number of small pixels 4. Each pixel is individually modulated, with the pattern of different pixels combining to form an overall image. The pixels in effect form a large number of parallel data transmission paths, each of which can be operated upon generally independent of the others. For example, in optical data processing each pixel may be viewed as an individual data source.

The pixels may be encoded with information in a variety of ways. For purposes of this invention, the two encoding methods of greatest interest are intensity and phase coding. With intensity coding, the intensity (equal to the square of the amplitude) of the light beam at any given pixel expresses the information carried by that pixel. For a coherent beam, a cross-section of the beam would reveal an essentially plane wave with each of the pixels in phase with the other pixels, but characterized by their own individual optical intensities. A phase encoded coherent beam on the other hand, can have a uniform intensity for all of its pixels, but the phases of the various pixels will vary in accordance with the data imposed upon them.

Figure 2:
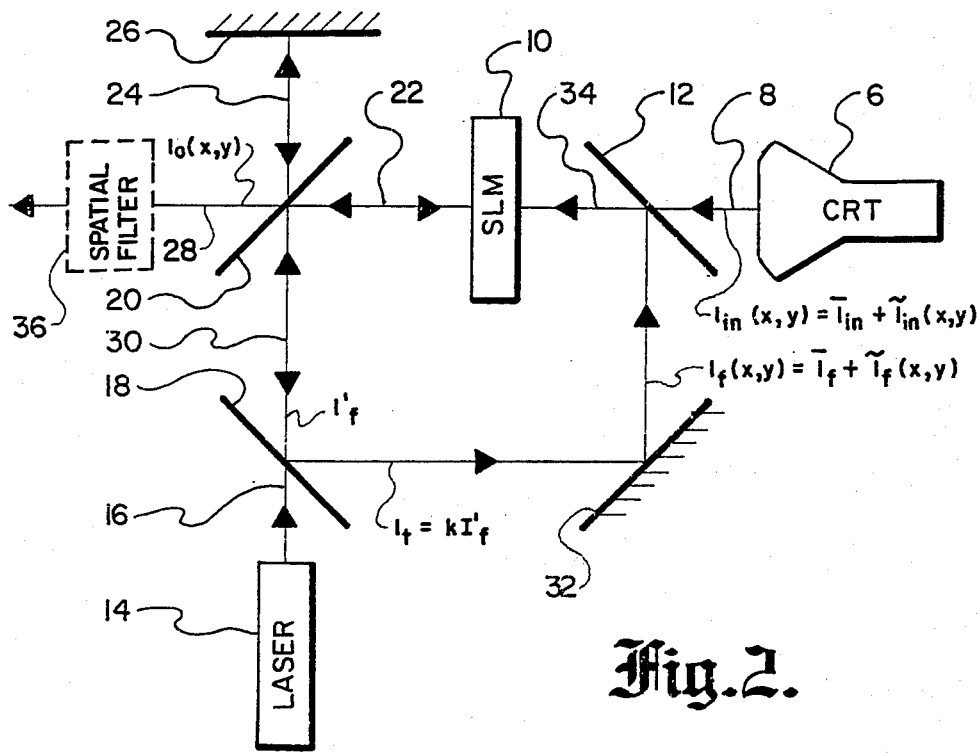
FIG. 2 is a block diagram of an noncoherent-to-coherent spatial light modulation system constructed in accordance with the invention.

For optical data processing, Fourier transformations and similar operations, it is desirable to work with coherent rather than noncoherent beams. A system which performs the desired noncoherent-to-coherent transformation, but at a considerably higher speed and with greater linearity than has previously been achievable, is illustrated in FIG. 2. A noncoherent light beam source is illustrated as a cathode ray tube (CRT) 6, but could also be provided by light emitting diodes, laser diodes, or any high-speed scanning system such as an accousto-optic scanner. For purposes of this application, the terms "light" and "optical" are intended in their broad sense as not being limited to the visible portion of the electromagnetic spectrum, but rather include the infrared region and other wavelengths at which optical data processing can be performed.

The CRT 6 produces a noncoherent input beam 8 which is directed onto a spatial light modulator (SLM) 10 through a beam-splitter mirror 12; a lens system (not shown) may be employed to image the CRT screen onto the modulator.

In typical systems which transform a noncoherent spatially modulated beam to a coherent one, the SLM 10 is a device such as a liquid crystal light modulator which operates as a polarization rotator. However, some devices have been developed which provide intensity-to-phase spatial light modulation; one such device is described in the article referred to above. With these modulators, a coherent readout beam is spatially modulated by the SLM so that the phase of each pixel in the readout beam differs from the original readout plane wave by a certain amount, the amount varying with the optical intensity of a corresponding pixel in the noncoherent input beam. In the preferred embodiment of the present invention, such an intensity-to-phase SLM is employed.

On the readout side of the SLM, a laser 14 generates a coherent laser beam 16 which is transmitted through a beam splitter 18 to another beam splitter 20. From there the beam is divided into a readout beam 22 which is directed onto the opposite side of the SLM from the input beam 8, and a reference beam 24 which is reflected off a mirror 26 back to beam splitter 20. (Split portions of the beam which are not used in the system are not shown in FIG. 1.) The dimensions of readout beam 22 match those of input beam 8. The readout beam is directed onto the SLM in-line with the input beam, so that the intensity modulation on each pixel of the input beam is transferred as a phase modulation onto a corresponding pixel of the readout beam. If the input beam 8 operates by scanning across the input side of the SLM, the scan frame time must be appreciably faster than the SLM response time.

A cross-section of the reference beam 24 would reveal a plane wave, with all of the pixels mutually in-phase. By contrast, each pixel of the readout beam after processing by the SLM will have an individual phase adjustment determined by the optical intensity of the corresponding pixel in the input beam. Thus, each pixel in the reflected readout beam will generally be out-of-phase with the corresponding pixel in the reflected reference beam. The readout and reference beams are both reflected back to beam splitter 20, which combines the two beams; each pixel of the reflected readout beam is superimposed on the corresponding pixel of the reflected reference beam. The two beams are thus combined into an output beam 28, and a feedback beam 30 which travels back along the path of the original laser beam to beam splitter 18. Since the reference beam is coherent and the reflected readout beam has only a modulated deviation from pure coherency, each pixel in the output and feedback beams will exhibit an interference pattern determined by the phase difference between the reference and readout beams at that pixel. The combination of laser 14, beam splitter 20, SLM 10 and reflector 26 thus form an interferometer which produces the spatially modulated output and feedback beams. Since the optical intensity at each pixel in the output beam varies with the interference pattern in that pixel which in turn is a function of the spatial phase modulation applied to the readout beam by the SLM, a proper design of the interferometer will result in a conversion from noncoherent input beam 8 to generally coherent output beam 28, with an approximately linear intensity-to-intensity transfer function, and a minimal residual parasitic phase modulation.

To ensure that the intensity of the output beam goes up for increases in the input beam intensity, and vice versa, the SLM 10 and reflector 26 are positioned relative to beam splitter 20 to establish either an approximately 90° or −90° phase differential between the reflected readout and reference beams, depending upon whether the SLM is inverting (negative readout phase shift for positive input intensity variations) or non-inverting. The SLM and the write in intensities produced by the CRT are selected to produce a phase shift variation out of the SLM falling between 60° and 120° as illustrated in FIG. 3. This linearizes the interferemeter output changes resulting from a given phase change produced by the SLM, as illustrated in FIG. 3. To produce the 90° phase shift, the round trip distance between beam splitter 20 and SLM 10 should differ from the round trip distance between beam splitter 20 and reflector 26 by ¼ the wavelength of the laser beam, plus any integer multiple of the wavelength. Stated another way, the distance between the beam splitter and SLM should differ from the distance between the beam splitter and reflector by ⅛ the laser wavelength, plus a half-integer multiple of the wavelength.

The combination of the two interfering beams which yields $I_f$ gives an intensity response which is a function of the differential path phase, shift $\phi_L$, plus or minus an incremental phase shift $\phi_{LV}$ from the light valve or SLM, as illustrated in FIG. 3. In the preferred implementation the light valve phase shift is held to ±45° for three reasons: (a) The intensity $I_f$ is then, very nearly, a linear function of the noncoherent intensity, produced by the CRT output $I_{in}$ (x,y); (b) The parasitic phase shifts induced on the output beam $I_o$ (x,y) are small under these conditions; and (c) The electrooptic layer can be relatively thin, which improves the speed of response for liquid-crystal light valves and minimizes the diver voltages for solid-state electrooptic light valves.

By the law of energy conservation, any increase in the optical intensity of output beam 28 will be matched by a complementary decrease in the intensity of feedback beam 30. The creation and use of a feedback beam is an important part of the invention, and results in a substantial improvement in response time and perhaps linearity when compared with prior systems. The intensity of each of the pixels in feedback beam 30 varies negatively with respect to spatial intensity variations in the input beam.

The feedback beam is reflected by beam splitter 18 and a reflector 32 to the underside of beam splitter 12, where it is combined with input beam 8 to produce a combination input beam 34 to the SLM. The transmission path for feedback beam 30 must be carefully set so that, upon reflection from beam splitter 12, each pixel in the feedback beam is aligned with and travels superimposed upon its corresponding pixel in the input beam 8. One of the unique aspects of the invention is thus the combination of a coherent feedback beam with a noncoherent input beam, to provide a combined coherent-noncoherent input to the SLM.

A consequence of the restricted phase modulation range of the SLM is that the contrast ratio in the coherent beam output intensity $I_o$(x,y) cannot be 100%, as is evident from FIG. 3. In many applications this is not an important consideration. However, for those applications which require high contrast, one may include a spatial filter 36 as illustrated by the dashed box of FIG. 2, which may be implemented by the conventional lens and field stop system illustrated in FIG. 4. A partially transmitting field stop 38, which may be implemented as a thin film of absorbent material such as aluminum mounted on a transparent substrate, is located at the crossover point between a pair of lenses 40, 42. It modifies the contrast ratio by attenuating low spatial frequencies. The transmission of the field stop controls the average intensity in the output beam to yield the desired contrast ratio.

Both the input and feedback beams will have average (or "DC") components, plus variational components. The combination of the interferometer and the SLM is chosen such that the variational feedback signal $I_F$(x,y) is nearly the negative of the variational input signal $I_{IN}$(x,y). More precisely, $I_F$(x,y) is preferably chosen to be related to $I_{IN}$(x,y) by the scaling $-G/1+G$, where G is the loop gain of the feedback system. Although the average component of the feedback signal does not subtract from the average component of the input signal, the feedback operation is still negative because of the negative relationship between the variational components. This establishes a stable operating point under feedback operation, provided that the spatial intensity distribution of the input beam does not drift.

In an implementation of the invention, the SLM was provided by a liquid crystal light valve modified to parallel alignment, with a 4 micron thick liquid crystal layer. It was determined that loop gains G of the order of 14 are achievable with such a device, together with 10%-90% response times of about 1.0 msec. It is estimated that optimum performance might be achieved with liquid crystal layer thicknesses between about 1.5 and 2.5 microns. Based upon the implementation with the 4 micron light valve, it is estimated that a response time of about 0.25 msec. could be achieved for a 2 micron device. Operating open loop, the same light valve would exhibit a response time in the order or 2 msec. The linearity of the intensity-to-intensity transfer characteristic should also be improved with the use of the novel feedback loop and interferometric phase-to-intensity transformation.

Other types of SLMs that produce a voltage controlled phase shift and operate in response to a noncoherent beam could also be used. These include the gamma Ruticon described on p. 149 of the Casasent article mentioned above and, the photo DKDP structure described on p. 152 of Casasent. A combination of a camera to convert an image to an electrical signal, and a device such as an electron beam driven dielectric oil film light modulator to convert the electrical signal into a coherent output beam, could also be used.

While a particular embodiment of the invention has been shown and described, it should be understood that numerous variations and alternate embodiments will occur to those skilled in the art. For example, instead of an intensity-to-phase modulator, an intensity-to-intensity or intensity-to-polarization rotation modulator might be used in conjunction with an appropriately modified feedback loop. Accordingly, it is intended that the invention be limited only in terms of the appended claims.

I claim:

1. A spatial light modulation system for spatially encoding a coherent readout beam with information from a noncoherent input light beam, comprising:
   a light modulator adapted to receive a noncoherent input light beam and a coherent readout light beam, and to spatially encode the input spatial light pattern onto the readout beam,
   means responsive to the readout beam for forming a feedback beam having a spatial encoding which varies in a negative fashion with respect to spatial variations in the input beam, and
   means for combining the feedback beam with the input beam in a negative feedback loop, thereby enhancing the responsivity of the readout beam to variations in the input beam.

2. The system of claim 1, wherein the light modulator encodes intensity variations in the input beam to phase variations in the readout beam, further comprising means for establishing a reference beam having a predetermined spatial phase relationship to an unencoded readout beam, and means for combining the reference and encoded readout beams to produce an output beam with a spatial intensity pattern corresponding to the input beam intensity pattern, and the feedback beam with a spatial intensity pattern that varies in a manner generally complementary to variations in the output beam pattern.

3. The system of claim 2, wherein the reference beam is established with a generally 90° spatial phase differential with respect to an unencoded readout beam from the modulator.

4. The system of claim 2, wherein the readout and reference beams are formed from a common beam source.

5. The system of claim 4, wherein the reference and readout beams are established by a laser, a beam splitter and a reflector means, the beam splitter being positioned to split a beam from the laser into readout and reference beams, the modulator being positioned to encode and direct the readout beam back to the beam splitter, the reflector means being positioned to reflect the reference beam back to the beam splitter with said predetermined spatial phase relationship to the readout beam, the beam splitter combining the reflected reference and encoded readout beams into said output and feedback beams.

6. The system of claim 1, wherein the light modulator and the means for forming a feedback beam are selected to produce a feedback beam having spatial intensity variations $I_F(x,y)$ which vary with the input beam spatial intensity variations $I_{IN}(x,y)$ substantially in accordance with:

$$I_F(x,y) = -I_{IN}(x,y)G/(1+G),$$

where G is the loop gain of the feedback system.

7. A spatial light modulation system for obtaining an output coherent spatial light pattern which corresponds to an input noncoherent spatial light intensity pattern, comprising:
a light modulator adapted to receive a noncoherent input optical beam and a coherent readout optical beam, and to spatially encode the intensity pattern of the input beam onto the phase of the readout beam,
means for establishing a coherent reference beam and the coherent readout beam such that the reference beam has as predetermined spatial phase relationship to the unencoded readout beam,
means for combining the reference and readout beams to produce an output beam with a spatial intensity pattern corresponding to the input beam intensity pattern, and
means for providing a coherent feedback beam in combination with the noncoherent input optical beam to the light modulator to provide a combined coherent-noncoherent input to the light modulator.

8. The system of claim 7, wherein the reference beam is established with a generally 90° spatial phase differential with respect to the unencoded readout beam.

9. The system of claim 7, wherein the readout and reference beams are formed from a common coherent beam source.

10. The system of claim 9, wherein the means for establishing the reference and readout beams, includes the common coherent beam source, a beam splitter and a reflector means, the beam splitter being positioned to split a beam from the common coherent beam source into readout and reference beams, the modulator being positioned to encode and direct the readout beam back to the beam splitter, the reflector means being positioned to reflect the reference beam back to the beam splitter with said predetermined spatial phase relationship to the readout beam, the beam splitter combining the reflected reference and encoded readout beams into said output beam.

11. An intensity-to-intensity spatial light modulation system, comprising:
an amplitude-to-phase spatial light modulator,
means for directing a noncoherent, spatially intensity modulated input beam as an input to the modulator,
means for forming a coherent readout beam,
means for directing the readout beam onto the modulator, the readout beam being reflected from the modulator with a spatial phase modulation corresponding to the input beam's spatial intensity modulation,
means for forming a reference beam having a predetermined spatial phase relationship with respect to an unencoded readout beam,
means for combining the reference and encoded readout beams to produce an output beam with a spatial intensity pattern determined by the phase-interference pattern between the reference and readout beams, and a feedback beam with a spatial intensity pattern that varies in a manner generally complementary to variations in the output beam pattern, and
means for combining the feedback beam with the input beam in a negative feedback loop, thereby enhancing the responsivity of the output beam to variations in the input beam.

12. The system of claim 11, wherein the reference and readout beams are established by a laser, a beam splitter and a reflector means, the beam splitter being positioned to split a beam from the laser into readout and reference beams, the modulator being positioned to encode and direct the readout beam back to the beam splitter, the reflector means being positioned to reflect the reference beam back to the beam splitter with said predetermined spatial phase relationship to the readout beam, the beam splitter combining the reflected reference and encoded readout beams into said output and feedback beams.

13. The system of claim 12, wherein the round trip distance for the reference beam between the beam splitter and reflector means differs from the round trip distance for the readout beam between the beam splitter and modulator by approximately ¼ the laser beam wavelength, thereby establishing a generally 90° spatial phase differential between the reference beam and an unencoded readout beam the polarity of the phase differential being selected so that the spatial intensity of the output beam varies in positive proportion to that of the input beam.

14. The system of claim 11, wherein the light modulator and the means for forming a feedback beam are selected to produce a feedback beam having spatial intensity variations $I_F(x,y)$ which vary with the input beam spatial intensity variations $I_{IN}(x,y)$ substantially in accordance with:

$$I_F(x,y) = -I_{IN}(x,y)G/(1+G),$$

where G is the loop gain of the feedback system.

15. A method for spatially encoding a coherent readout beam with information from a noncoherent input light beam, comprising:
spatially encoding the input beam spatial light pattern onto a coherent readout beam,
forming a feedback beam having a spatial encoding which varies in a negative fashion with respect to spatial variations in the input beam, and
combining the feedback beam with the input beam in a negative feedback loop to enhance the responsivity of the readout beam to variations in the input beam.

16. The method of claim 15, wherein spatial intensity variations in the input beam are encoded to phase variations in the readout beam, and further comprising the steps of establishing a reference beam having a predetermined spatial phase relationship to an unencoded readout beam, and combining the reference and encoded readout beams to produce an output beam with a spatial intensity pattern corresponding to the input beam intensity pattern and the feedback beam with a spatial intensity pattern that varies in a manner generally complementary to variations in the output beam pattern.

17. The method of claim 16, wherein the reference beam is established with a generally 90° spatial phase differential with respect to an unencoded readout beam.

18. The method of claim 15, wherein the feedback beam is formed with spatial intensity variations $I_F(x,y)$ which vary with the input beam spatial intensity variations $I_{IN}(x,y)$ substantially in accordance with:

$$I_F(x,y) = -I_{IN}(x,y)\, G/(1+G),$$

where G is the feedback loop gain.

19. A method for obtaining an output beam with a coherent spatial light pattern that corresponds to the spatial light intensity pattern of a noncherent input beam, comprising:

spatially encoding the intensity pattern of the input beam onto the phase of a coherent readout beam, establishing a coherent reference beam having a predetermined spatial phase relationship to the readout beam prior to encoding, combining the reference and readout beams to produce an output beam with a spatial intensity pattern corresponding to the input beam intensity pattern, and feeding back a feedback beam, with a spatial encoding which varies in a negative fashion with respect to spatial variations in the intensity pattern of the noncoherent input beam, for combination with the input beam to influence said step of spatial encoding.

20. The method of claim 19, wherein the reference beam is established with a generally 90° spatial phase differential with respect to an unencoded readout beam, and the output beam is transmitted through a field stop to modify the contrast ratio.

* * * * *

UNITED STATES PATENT AND TRADEMARK OFFICE
CERTIFICATE OF CORRECTION

PATENT NO. : 4,854,677

DATED : August 8, 1989

INVENTOR(S) : THOMAS R. O'MEARA

It is certified that error appears in the above-identified patent and that said Letters Patent is hereby corrected as shown below:

CLAIM 7, column 7, line 40, after "beam has" delete "as" and insert therefor --a--; and CLAIM 13, column 8, line 45, after "coded readout beam" insert a comma [,].

Signed and Sealed this

Third Day of November, 1992

Attest:

DOUGLAS B. COMER

*Attesting Officer*     *Acting Commissioner of Patents and Trademarks*